US012084991B2

(12) United States Patent
Russo et al.

(10) Patent No.: US 12,084,991 B2
(45) Date of Patent: Sep. 10, 2024

(54) PLANT FOR PRODUCING MECHANICAL ENERGY FROM A CARRIER FLUID UNDER CRYOGENIC CONDITIONS

(71) Applicant: SYLANS SAGL, Chiasso (CH)

(72) Inventors: Vitaliano Russo, Milan (IT); Pietro Muti, Genoa (IT)

(73) Assignee: SYLANS SAGL, Chiasso (CH)

( * ) Notice: Subject to any disclaimer, the term of this patent is extended or adjusted under 35 U.S.C. 154(b) by 0 days.

(21) Appl. No.: 18/040,489

(22) PCT Filed: Dec. 14, 2021

(86) PCT No.: PCT/IB2021/061679

§ 371 (c)(1),
(2) Date: Feb. 3, 2023

(87) PCT Pub. No.: WO2022/130189

PCT Pub. Date: Jun. 23, 2022

(65) Prior Publication Data

US 2023/0296035 A1 Sep. 21, 2023

(30) Foreign Application Priority Data

Dec. 17, 2020 (IT) ........................ 102020000031184

(51) Int. Cl.
*F01K 25/10* (2006.01)
*F02G 1/043* (2006.01)

(52) U.S. Cl.
CPC .............. *F01K 25/10* (2013.01); *F02G 1/043* (2013.01); *F02G 2270/90* (2013.01)

(58) Field of Classification Search
CPC . F01K 25/10; F01K 7/32; F02G 1/043; F17C 2223/0161; F17C 2221/011; F17C 2221/014; F17C 2221/033
See application file for complete search history.

(56) References Cited

U.S. PATENT DOCUMENTS 4,765,143 A 8/1988 Crawford et al.
2010/0005801 A1* 1/2010 Negre .................... F01K 25/10 60/519
2019/0218944 A1 7/2019 Dupont

FOREIGN PATENT DOCUMENTS

DE 102004032215 A1 1/2006

OTHER PUBLICATIONS

International Search Report and Written Opinion dated Apr. 4, 2022 from counterpart International Patent Application No. PCT/IB2021/061679.

* cited by examiner

*Primary Examiner* — Loren C Edwards
(74) *Attorney, Agent, or Firm* — SHUTTLEWORTH & INGERSOLL, P.L.C.; Timothy J. Klima

(57) ABSTRACT

A plant for producing mechanical energy from a carrier fluid under cryogenic conditions, includes a cryogenic tank for storing the fluid under cryogenic conditions and a capacitive tank. The plant includes a supply circuit, connecting the cryogenic tank and the capacitive tank. A pump increases the pressure of the fluid, and a main heat exchanger, arranged downstream of the pump promotes a thermal exchange between a thermal source and the fluid to increase the temperature of the fluid and evaporate the fluid. The plant provides an engine body for producing mechanical energy and including a work chamber having an inlet port, arranged in fluid communication with the capacitive tank, and an outlet port connected to a discharge circuit for the spent fluid, and a recirculation circuit to convey a portion of the spent fluid into the capacitive tank.

14 Claims, 7 Drawing Sheets

PLANT FOR PRODUCING MECHANICAL ENERGY FROM A CARRIER FLUID UNDER CRYOGENIC CONDITIONS

This application is the National Phase of International Application PCT/IB2021/061679 filed Dec. 14, 2021 which designated the U.S.

This application claims priority to Italian Patent Application No. 102020000031184 filed Dec. 17, 2020, which applications are incorporated by reference herein.

TECHNICAL FIELD

The present invention relates to a plant and a method for producing mechanical energy from a carrier fluid under cryogenic conditions.

The term "cryogenic conditions" is intended to mean a carrier fluid in a low-temperature state, and in particular at a temperature lower than the respective critical point temperature of the carrier fluid, and in a low-pressure state, substantially equal to atmospheric pressure.

Moreover, the term "carrier fluid" is intended to mean fluids belonging to the family of cryogenic liquids such as, for example, nitrogen, oxygen, ammonia, as well as generic fluids having their critical temperature well below room temperature such as, for example, methane.

The present invention is used in various applications including, for example, electricity generation, propulsion (land, railway, naval), the handling of industrial machinery, or the high-efficiency re-gasification of fluids under cryogenic conditions (e.g., methane after transport on a methane tanker).

STATE OF THE ART

Engines powered by compressed air are known. A historical example is represented by the locomotives of the Naples-Portici railway line, whose pneumatic engines were powered by compressed air stored in a pressurized tank and taken by a distributor metering the quantity of compressed air required by the engine cycle and from which to obtain the mechanical energy.

A serious problem with this system is that it could only be fed at a relatively low pressure, up to 12 bar, due to safety problems. The low pressure allowed a limited amount of compressed air charge to be placed in the tank, thus resulting in a limited operating autonomy.

Moreover, the progressive bleeding of compressed air from the tank led to a decrease in the air pressure itself, with consequent reduction in functionality until the engine stopped.

A further problem was linked to the high consumption of air taken from the tank. In fact, the direct use of compressed air taken as a carrier gas did not allow any savings.

Another problem was the cost of supplying the compressed air supplied by a compressor which, as is known, has low efficiency and involves very high supply costs.

Moreover, in this solution, even if the air pressure were increased in order to increase the power obtainable from the engine, there would still be other problems linked to the use of compressed air.

The first problem is that the expansion of the air and the related decrease in temperature can generate condensation of water and carbon dioxide which, at certain values, can disrupt the operation of the engine. The second problem is linked to the low temperature reached by the exhaust gas at the engine exhaust, which can cause safety problems and/or environmental damage. For these reasons, the air is never compressed beyond 10-12 bar.

The success of compressed air engines is therefore limited to applications where, for safety reasons, the use of fuels and/or electric motors is not recommended such as, for example, in coal mines. Basically, this family of compressed air engines is that of pneumatic engines that have high consumption of compressed air.

OBJECT OF THE INVENTION

In this context, the technical task underlying the present invention is to propose a plant and a method for producing mechanical energy from a carrier fluid under cryogenic conditions, which overcome the above-mentioned drawbacks of the prior art.

In particular, it is an object of the present invention to provide a plant and a method for producing mechanical energy from a carrier fluid under cryogenic conditions in an efficient and continuous manner.

A further object of the present invention is to provide a plant and a method for producing mechanical energy from a carrier fluid under cryogenic conditions, which are free of condensation and/or "ice" problems at the exhaust of the plant itself.

A further object of the present invention is to provide a plant and a method for producing mechanical energy from a carrier fluid under cryogenic conditions apt to operate with very low consumption of carrier fluid.

A further object of the present invention is to provide a plant and a method for producing mechanical energy from a carrier fluid under cryogenic conditions, which do not affect the environment.

The specified technical task and objects are substantially achieved by means of a plant for producing mechanical energy from a carrier fluid under cryogenic conditions, comprising a cryogenic tank configured for storing said carrier fluid under said cryogenic conditions and a capacitive tank. The plant further comprises a supply circuit, arranged as a connection between the cryogenic tank and the capacitive tank and comprising a pump, configured to increase the pressure of the carrier fluid, and a main heat exchanger, arranged downstream of the pump and configured to promote a thermal exchange between a thermal source and the carrier fluid so as to increase the temperature of the carrier fluid and evaporate said carrier fluid. The plant provides an engine body, configured for producing mechanical energy and comprising at least one work chamber having an inlet port, arranged in fluid communication with the capacitive tank, and an outlet port connected to a discharge circuit for the spent carrier fluid, and a recirculation circuit designed to convey a portion of the spent carrier fluid into the capacitive tank.

Furthermore, the specified technical task and objects are substantially achieved by means of a method for producing mechanical energy from a carrier fluid under cryogenic conditions, comprising the preliminary steps of:

- preparing a cryogenic tank containing a fluid at a cryogenic temperature Tcryo and a pressure level Pcryo;
- preparing a capacitive tank;
- preparing an engine body designed to host an expansion phase and a compression phase;
- supplying the capacitive tank with a mass M2 at a pressure level Prec and a supply temperature Trec;

The method also comprises the cyclical steps of:

raising the pressure of the carrier fluid from the Pcryo level to the Pproc level, where Pproc is greater than Pcryo and Prec;

raising the temperature of the carrier fluid from Tcryo to a first process temperature Tproc1, where Tproc1 is greater than Tcryo;

raising the temperature of the carrier fluid from Tproc1 to a second process temperature Tproc2, where Tproc2 is greater than Tproc1;

supplying the capacitive tank with a mass M1 of carrier fluid at the temperature Tproc2 and pressure level Pproc;

mixing the masses M1 and M2 of carrier fluid, obtaining a mass M1+M2 at the supply temperature Tfeed and pressure level Pfeed;

supplying the mass M1+M2 of carrier fluid at the pressure level Pfeed and supply temperature Tfeed from the capacitive tank to the engine body;

expanding the mass M1+M2 of carrier fluid in the engine body, so as to lower the pressure from the level Pfeed to the level Pex, wherein Pex is less than Pfeed, and to lower the temperature from Tfeed to Tex, wherein Tex is less than Tfeed, producing mechanical energy;

discharging the mass M1 of fluid towards an external environment;

compressing the mass M2 of fluid so as to raise the pressure from the level Pex to the level Prec and so as to raise the temperature from Tex to Trec to supply the capacitive tank with said mass M2 at the pressure level Prec and supply temperature Trec.

BRIEF DESCRIPTION OF THE DRAWINGS

Further features of the present invention will become more apparent from the indicative, and therefore non-limiting description of a preferred, but not exclusive, embodiment of such a device, as illustrated in the accompanying drawings wherein.

DETAILED DESCRIPTION OF PREFERRED EMBODIMENTS OF THE INVENTION

Figure 1:
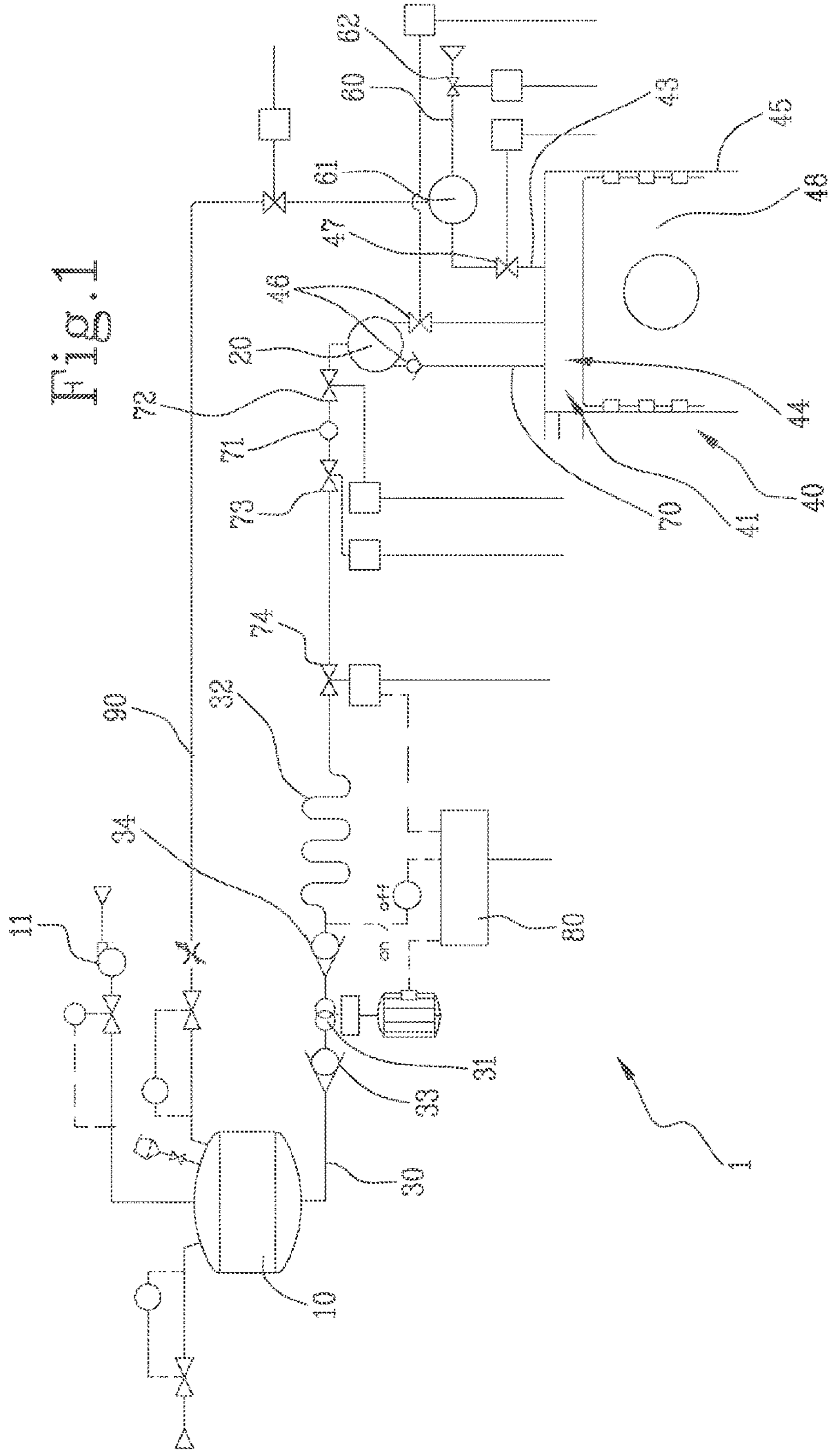
FIG. 1 schematically shows a preferred embodiment of a plant for producing mechanical energy in accordance with the present invention.

With reference to the accompanying figures, the reference numeral "1" indicates, as a whole, a plant for producing mechanical energy from a carrier fluid under cryogenic conditions.

The term "cryogenic conditions" is intended to mean a carrier fluid in a low-temperature state, and in particular at a temperature lower than the respective critical point temperature of the carrier fluid, and in a low-pressure state, substantially equal to atmospheric pressure.

Moreover, the term "carrier fluid" is intended to mean fluids belonging to the family of cryogenic liquids such as, for example, nitrogen, oxygen, ammonia, as well as generic fluids having their critical temperature well below room temperature such as, for example, methane.

Essentially, as shown in FIG. 1, the plant 1 comprises a cryogenic tank 10, a capacitive tank 20, a supply circuit 30, which connects the cryogenic tank 10 to the capacitive tank 20 and comprises a pump 31, and a main heat exchanger 32, an engine body 40, a discharge circuit 60, and a recirculation circuit 70.

The cryogenic tank 10 is configured for storing the carrier fluid under the aforementioned cryogenic conditions.

Under normal operating conditions, almost all of the carrier fluid in the cryogenic tank 10 is in the liquid state. However, as will be seen hereinafter, a relatively small percentage of carrier fluid stored inside the cryogenic tank 10 can be provided in the gaseous state or, if necessary, the carrier fluid can be transformed into the solid state.

Advantageously, since the carrier fluid is stored in the cryogenic tank 10 at a pressure substantially equal to the ambient pressure, the problems concerning pressurized tanks are solved.

In terms of sizing, the size of the cryogenic tank 10 can be established "ad hoc" depending on the use of the plant and on the space and autonomy requirements.

Advantageously, since almost all of the carrier fluid is substantially stored in the liquid state, it is possible to accumulate a large amount thereof.

For the same volume, in fact, the carrier fluid in the liquid state has a mass as high as hundreds of times that of the same carrier fluid in the gaseous state.

According to one aspect of the present invention, the cryogenic tank 10 may comprise a suction vacuum pump 11 configured to extract a portion of carrier fluid in the gaseous state from the cryogenic tank 10 to obtain a pressure lower than the atmospheric pressure inside the cryogenic tank 10.

In particular, said vacuum pump 11 can be operationally arranged in an upper portion of the cryogenic tank 10, so as to draw from the gaseous portion of the carrier fluid which lies above the liquid portion of the carrier fluid.

According to a preferred use of said vacuum pump 11, it can be used to create pressure and temperature conditions inside the cryogenic tank 10 such as to determine the triple point thermodynamic state of the carrier fluid.

Even more preferably, the vacuum pump 11 can be used so that in the cryogenic tank 10 a pressure and a temperature lower than the pressure and temperature determining the triple point thermodynamic state are reached.

This feature can be advantageously used, by way of non-limiting example, in naval applications, where it is necessary to solidify—at least partially—the carrier fluid stored inside the cryogenic tank 10, so as to limit or even eliminate the resonance phenomena, preventing the ship from overturning.

This condition is adjustable.

The supply circuit 30, which connects the cryogenic tank 10 to the capacitive tank 20, is operationally arranged downstream of the cryogenic tank 10.

Generally, the supply circuit 30 is configured to modify the thermodynamic conditions of the carrier fluid so as to make it advantageously usable from the energy point of view.

The supply circuit 30 comprises the pump 31, configured to increase the pressure of the carrier fluid, and the main heat exchanger 32, operationally arranged downstream of the pump 31 and configured to promote a thermal exchange between a thermal source and the carrier fluid so as to increase the temperature of the carrier fluid and evaporate the carrier fluid, preferably evaporate the carrier fluid completely.

The pump 31 may be operationally arranged inside the cryogenic tank 10, or may be operationally arranged in fluid communication with the cryogenic tank 10 via a conduit.

Specifically, the pump 31 is operationally arranged so that it can draw the carrier fluid in a liquid state from the cryogenic tank 10.

A check valve 33 may also be provided between the cryogenic tank 10 and the pump 31.

Advantageously, this check valve 33 allows the pump 31 to be used intermittently without causing "regurgitation" towards the cryogenic tank 10, and therefore pressure increases in the cryogenic tank 10 due to the carrier fluid going back from the supply circuit 30 to the cryogenic tank 10. This allows the cryogenic tank 10 to be sized and the thermal insulation to be addressed in an optimal way.

Advantageously, by operating on a substantially incompressible liquid, the pump 31 requires a negligible operating energy cost compared to the mechanical energy produced by the plant 1 as a whole.

According to a further aspect, the pump 31 can be controlled and adjusted according to the speed of the engine body 40.

Functionally, as will be explained in detail hereinafter, the pump 31 causes an increase in the pressure of the carrier fluid, so as to obtain a high-pressure carrier fluid in the liquid state.

Preferably, the carrier fluid is brought to a normally supercritical pressure value.

Figure 4:
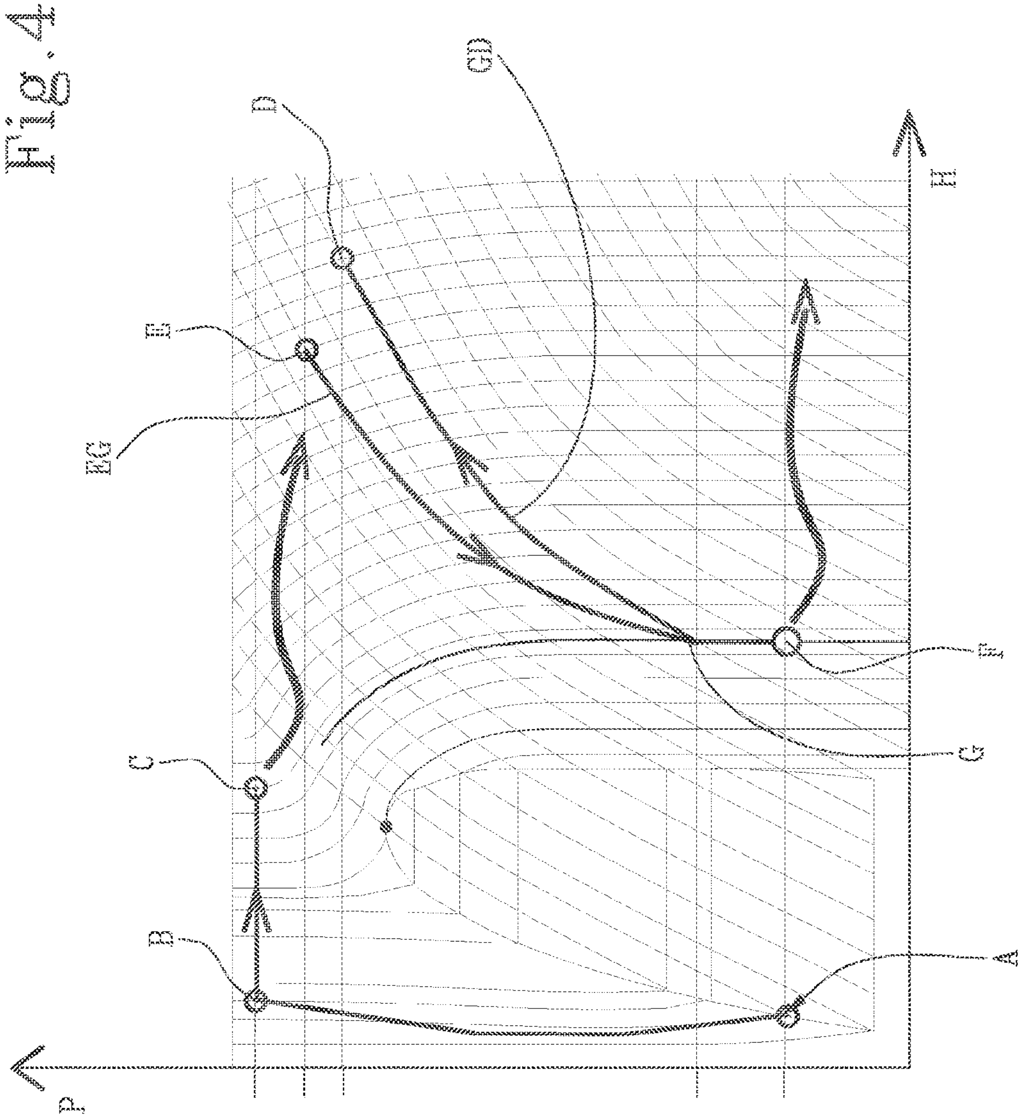
FIG. 4 shows a Mollier diagram of the open working cycle of the plant in FIG. 1.

This transformation is shown in FIG. 4 on the Mollier diagram by segment AB.

A check valve 34 may be arranged between the pump 31 and the main heat exchanger 32.

The check valve 34 can be configured to remove the load on the pump 31 caused by possible regurgitation of the carrier fluid in the gaseous state returning from the heat exchanger 32 and by actions on the carrier fluid that flows through the supply circuit 30 due to the effect of the pump 31.

The main heat exchanger 32 is configured to heat the high-pressure, liquid carrier fluid and promote a change of state thereof.

In particular, the main heat exchanger 32 is configured to promote a change of state of the carrier fluid from the liquid state to the gaseous state, preferably to a supercritical gas phase.

Specifically, the main heat exchanger 32 causes the temperature reached by the carrier fluid to be higher than the respective critical temperature.

Furthermore, the main heat exchanger 32 is configured to maintain the pressure of the carrier fluid substantially constant with respect to the value acquired following the work of the pump 31.

In the present description, the term "thermal source" is intended to mean any heat source having a temperature higher than the carrier fluid at the outlet of the pump 31 and preferably higher than the critical temperature of the carrier fluid.

This thermal source may be of any nature, provided it is suitable for the purpose.

According to an exemplary and therefore non-limiting embodiment, atmospheric air or sea water can be used as in the known methane re-gasification applications.

According to a further embodiment, the main heat exchanger 32 can be associated, for example, with a solar collector plant which acts as a thermal source, so as to obtain thermal energy substantially at zero cost.

According to a further embodiment, the plant 1 can comprise an auxiliary plant for producing mechanical energy, not shown in the figures, associated with or associable with the main heat exchanger 32, which transfers its own thermal waste, which acts as a cold thermal source, to the main heat exchanger 32.

Preferably, this auxiliary plant for producing mechanical energy comprises a Stirling engine.

In particular, the Stirling engine is placed between the thermal source and the main heat exchanger 32.

Specifically, the Stirling engine uses the heat from the thermal source to supply energy to a respective expansion chamber of the Stirling engine, whereas it uses the main heat exchanger 32 to subtract energy from a respective compression chamber of the Stirling engine. In other words, the carrier fluid acts as a cold source, extracting heat from the Stirling engine.

In the presence of the Stirling engine, it may be particularly advantageous to provide a thermal source at a higher temperature than the atmospheric air and/or sea water. For example, the thermal source may comprise solar collectors or a low-enthalpy plant for heat recovery from other production cycles.

Structurally, the main heat exchanger 32 can be made according to any known type of construction, provided it is suitable for the purpose.

Functionally, inside the main heat exchanger 32, the heating of the carrier fluid basically takes place in two steps.

In a first step, the high-pressure, liquid carrier fluid receives heat from the thermal source by means of the main heat exchanger and undergoes a change of state, passing from the liquid to the gaseous state.

This change of state allows the high-pressure, gaseous carrier fluid to create the "hydraulic press" effect.

In fact, the volume of the carrier fluid in the liquid state is hundreds of times less than the volume occupied by the same mass of carrier fluid in the gaseous state.

Therefore, in the second heating step, this amplifying effect is used so as to further increase the temperature of the high-pressure, gaseous carrier fluid.

This transformation is shown in FIG. 4 on the Mollier diagram by segment BC.

Functionally, therefore, the supply circuit 30 transforms the low-pressure, liquid carrier fluid from the cryogenic tank 10 into a high-pressure, gaseous carrier fluid.

In summary, the carrier fluid stored in the cryogenic tank 10 is under cryogenic conditions, i.e., at very low temperatures, above the melting temperature of the respective carrier fluid and at a pressure substantially equal to atmospheric pressure.

In other words, the carrier fluid under cryogenic conditions is not in such conditions as to be used advantageously and directly to obtain mechanical work.

By using the supply circuit 30, the pressure of the carrier fluid is increased by means of the pump 31, and the temperature is changed by means of the main heat exchanger 32. In addition, the main heat exchanger 32 promotes a change of state, from liquid to gas, of the carrier fluid.

In this way, the carrier fluid at the outlet of the supply plant is in the "ex-liquid" condition, i.e., in the gaseous state at high pressure. This condition is shown in FIG. 4 by the reference "C".

The capacitive tank 20 is operationally arranged downstream of the main heat exchanger 32 and in fluid communication therewith.

As shown in FIG. 1, moreover, the supply circuit 30 can comprise a metering tank 73, a valve 72 configured to insulate the supply circuit 30, and a valve 73 placed between the metering tank 73 and the capacitive tank 20.

The capacitive tank 20 is configured to collect and mix a given quantity of "ex-liquid" carrier fluid from the supply circuit 30 with a respective quantity of recirculation carrier fluid recovered from the engine body 40 by means of the recirculation circuit 70, in order to advantageously supply the engine body 40.

In other words, said capacitive tank 20 is suitably sized to mix the "ex-liquid" carrier fluid and the recirculation carrier fluid so as to obtain a given quantity of carrier fluid defined as the "supply carrier fluid".

Moreover, said capacitive tank 20 is suitably sized to meter the supply carrier fluid with which the engine body 40 is to be to supplied.

This carrier fluid defined as the "supply carrier fluid" has pressure and temperature conditions averaged with respect to the pressure and temperature conditions of the "ex-liquid" carrier fluid and recirculation carrier fluid. This "supply" condition is shown in FIG. 4 by the reference "E".

The features of the recirculation circuit 70 as well as the dosage ratio between the "ex-liquid" carrier fluid and the recirculation carrier fluid will be illustrated in detail hereinafter.

The "recirculation" condition is instead shown in FIG. 4 by the reference "D".

The engine body 40 is configured for producing mechanical energy and comprises at least one work chamber 41 having an inlet port 42 arranged in fluid communication with the capacitive tank 20, from which it is supplied with the supply carrier fluid, and an outlet port 43 connected to the discharge circuit 60 for the spent carrier fluid, shown in FIG. 4 by the reference "G".

The expansion of the "ex-liquid" carrier fluid is shown in FIG. 4 by the reference "EG".

The work chamber 41 is configured to transform the expansion and/or movement of the supply carrier fluid into mechanical work by means of at least one movable wall 44.

Preferably, the movable wall 44 is bound to translate between an upper dead centre and a lower dead centre. Alternatively, the movable wall 44 can be bound to rotate about an axis.

The term "spent carrier fluid" is intended to mean the carrier fluid under conditions subsequent to this transformation, in which the carrier fluid has low enthalpy and temperature and pressure conditions suitable for emission into the environment.

The engine body 40 can be made according to any type, provided it is suitable for the required purpose.

According to a preferred embodiment, the engine body 40 is of the reciprocating motion type.

In particular, in a manner known per se, the engine body 40 comprises at least one cylinder 45 defining the work chamber 41 having the inlet port 42, associated with a supply valve 46, and the outlet port 43, associated with a discharge valve 47. The cylinder 45 houses a piston 48, which is slidingly constrained therein and integral with the respective movable wall 44, and a connecting rod 49, which is constrained to the piston 48. Lastly, the connecting rod 49 is constrained to a drive shaft 50.

Functionally, the engine body 40 is configured such that the transformation work of the engine body 40 on the supply carrier fluid can be substantially divided into two distinct operating steps.

In the first operating step, with the supply valve 46 open, high-pressure supply carrier fluid from the capacitive tank 20 is conveyed to the work chamber 41 of the engine body 40, which causes a first movement of the movable wall 44 and therefore a first movement of the drive shaft 50.

Since this is a mechanical mass transport phenomenon, in this first operating step, the pressure, temperature and enthalpy of the supply carrier fluid can be considered substantially constant.

In other words, mechanical energy is generated as a result of the transfer of a mass of the supply carrier fluid into the work chamber 41.

Furthermore, in the first operating step, the supply carrier fluid does not undergo thermodynamic transformations, but maintains the pressure and enthalpy substantially constant.

After the first operating step has been completed, a second operating step begins. This second operating step consists of a transformation similar to a polytropic transformation, which exchanges mechanical work with the movable wall 44 of the work chamber 41.

In particular, in the second operating step, part of the enthalpy of the supply carrier fluid is transformed into mechanical energy.

In particular, the temperature and pressure of the supply carrier fluid are reduced and the carrier fluid can be considered as spent carrier fluid.

In the second operating step, since the transfer of the mass of supply carrier fluid from the capacitive tank 20 to the work chamber 41 is finished, the mass of the carrier fluid within the work chamber can be considered constant.

The mechanical energy obtained in this second, expansion operating step is negligible compared to the mechanical energy obtained in the first, transfer operating step.

In the following description, a movement cycle of the engine body 40 is described as a function of the angle assumed by the drive shaft 50 during its rotation, which occurs in a clockwise direction.

In particular, the position of the drive shaft 50 in which the movable wall 44 is in the upper dead centre is assumed as an angle of 0 degrees.

In particular, in the first operating step, the drive shaft 50 is moved from 12 degrees to 50 degrees, whereas in the second operating step, the drive shaft 50 is moved from 50 degrees to 180 degrees.

According to a further embodiment, not shown in the accompanying figures, the engine body 40 may be of the flow engine type.

In this embodiment, the first operating step and the second operating step occur substantially simultaneously.

Once the operating steps have been completed, the spent carrier fluid is conveyed—at least partially—into the discharge circuit 60. The discharge circuit 60 is designed to discharge the carrier fluid into the environment under the conditions indicated by the reference "F" in the Mollier diagram in FIG. 4. The discharge circuit 60 may comprise a collection tank 61 for the spent carrier fluid and a discharge duct designed to at least partially expel the spent carrier fluid from the plant 1.

The discharge circuit 60 may further comprise a discharge valve 62.

According to a further aspect of the present invention, the plant 1 can comprise a system 80 for stopping the operation of the engine body 40 configured to stop the operation of the plant.

Preferably, the stopping system 80 can be associated with the pump 31 so as to be able to block the extraction of carrier fluid from the cryogenic tank 10 and therefore the supply to the plant 1.

The stopping system 80 can also act through the valve 74, connected to the stopping system 80.

According to one aspect of the present invention, the plant 1 can comprise a replenishment circuit 90 associated with the discharge circuit and configured to replenish the cryogenic tank 10 with a portion of the spent fluid passing through the discharge circuit 60, and in particular with a portion of spent fluid passing through the collection tank 61.

Alternatively, the plant 1 may comprise a replenishment circuit 90 associated with the supply circuit and configured to replenish the cryogenic tank 10 with a portion of the gaseous carrier fluid exiting the main heat exchanger 32.

Advantageously, the replenishment circuit 90 prevents the pressure decrease in the cryogenic tank 10, due to the bleeding of liquid carrier fluid exerted by the pump 31, from excessively decreasing the pressure inside the cryogenic tank 10, thus avoiding problems related, for example, to the solidification of the carrier fluid.

In fact, the carrier fluid in the gaseous state introduced into the cryogenic tank 10 by the replenishment circuit 90 maintains the pressure inside the cryogenic tank 10 substantially constant, net of the carrier fluid in the liquid state extracted by the pump 31.

Advantageously, moreover, the replenishment circuit 90 allows the pump to draw from the cryogenic tank 10 quantities such as to balance the pressure decrease caused by the instantaneous consumption of carrier fluid in the liquid state required for the operation of the plant 1.

In other words, as the pump 31 withdraws carrier fluid from the cryogenic tank 10, the operating pressure in the cryogenic tank 10 is restored by replacing the volume of carrier fluid in the liquid state, withdrawn by the pump 31, with a volume of the spent carrier fluid in a re-integrated gaseous state.

Pilot-operated valves for flow interception and regulation can be operationally arranged for the regulation of the flows in the discharge circuit 60 and replenishment circuit 90.

According to a particular aspect of the present invention, the recirculation circuit 70 is designed to convey a portion of the spent carrier fluid, drawn from the work chamber 41 of the engine body 40, into the capacitive tank 20.

Advantageously, the use of the recirculation circuit 70 allows the spent carrier fluid, discharged into the atmosphere from the discharge circuit 60, to have such temperature and pressure conditions as to be safe and suitable for the environment. In other words, the spent carrier fluid is discharged at such a pressure and temperature as not to damage the plant 1 and the environment.

The recirculation circuit 70 is in fact configured so as to draw part of the spent carrier fluid from the work chamber 41 and introduce it into the capacitive tank 20 following a polytropic compression, indicated in the Mollier diagram in FIG. 4 by the reference "GD", which increases the temperature and pressure thereof. In the capacitive tank 20, the recirculating carrier fluid mixes with the "ex-liquid" carrier fluid from the supply circuit 30, thereby increasing the pressure and temperature thereof. This state of the carrier fluid is indicated in the Mollier diagram in FIG. 4 by the reference "D".

In fact, the temperature of the recirculating carrier fluid, following the polytropic compression, is higher than the temperature of the "ex-liquid" carrier fluid from the supply circuit 30.

In contrast, the pressure of the recirculating carrier fluid is lower than the pressure of the "ex-liquid" carrier fluid from the supply circuit 30.

The mixing of the recirculating carrier fluid with the "ex-liquid" carrier fluid from the supply circuit 30 takes place in a predetermined and controlled manner, so as to define the supply carrier fluid.

In other words, the quantities of recirculating carrier fluid and carrier fluid from the supply circuit 30 must meet a predetermined reciprocal ratio, as will be explained hereinafter.

According to a preferred embodiment, this mass ratio between the recirculating carrier fluid and the "ex-liquid" carrier fluid is 23 to 1.

The polytropic compression, depending on the embodiment of the plant 1, can be carried out by means of a suitable compressor or advantageously by means of the engine body 40, using the return stroke from the lower dead centre to the upper dead centre of the piston 48.

Two embodiments of the plant 1 will be described in detail below, with particular attention to the technical characteristics of the engine body 40 and recirculation circuit 70, since the characteristics of the cryogenic tank 10 and supply circuit 30 are substantially the same.

A first embodiment is schematically shown in FIGS. 1, 2A-2C, and 3A-3F.

Figure 2A:
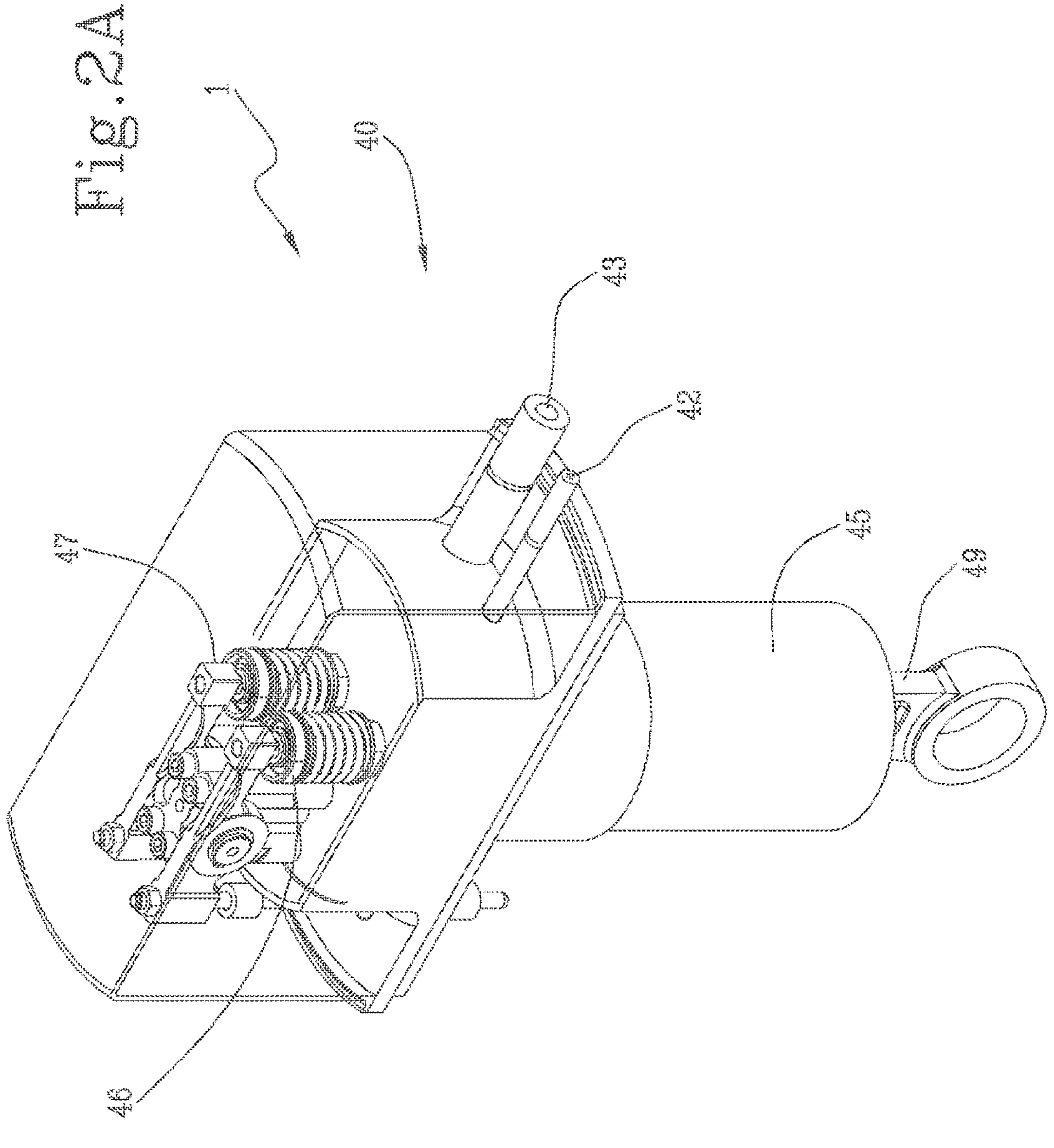
FIGS. 2A-2C show respective views of a component of the plant in FIG. 1.
Figure 2C:
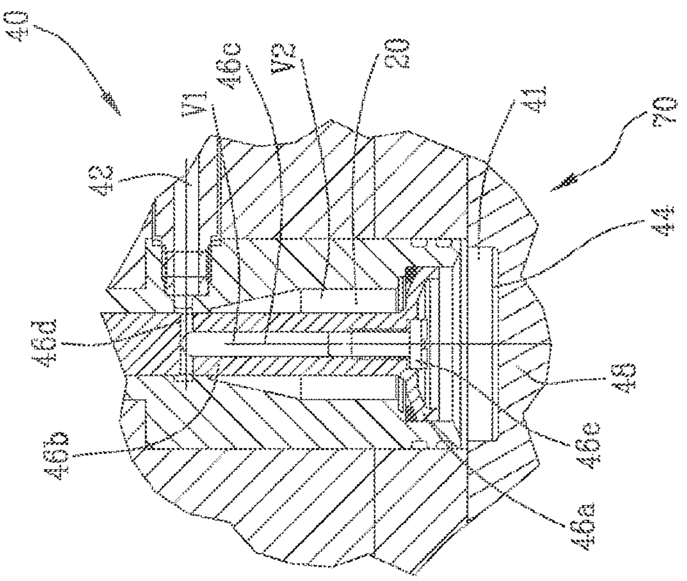
Figure 2B:
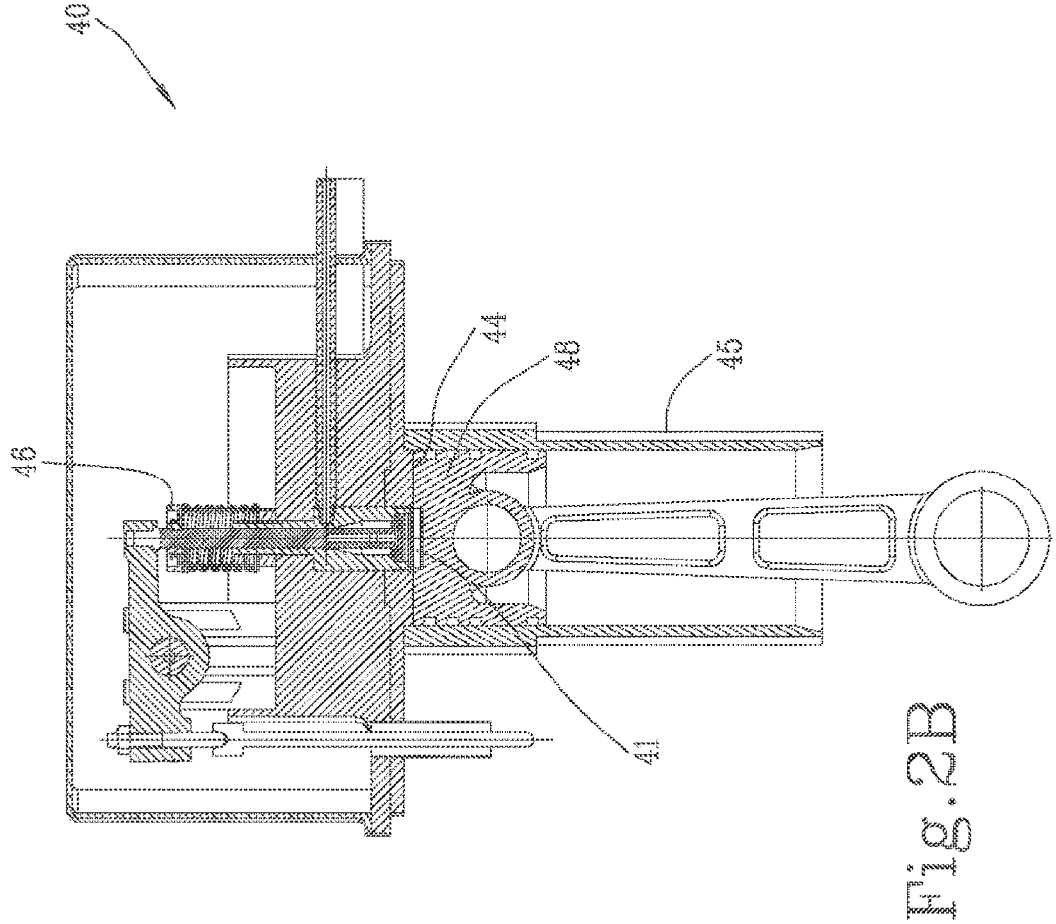

In this embodiment, the engine body is of the aforesaid reciprocating motion type, shown in FIGS. 2A-2C.

In this embodiment, the engine body 40 is configured to:

receive the supply carrier fluid;

host an expansion phase of the supply carrier fluid;

convert a displacement and/or expansion of the supply carrier fluid into mechanical energy; and host a compression phase of the spent carrier fluid.

In other words, the engine body 40 is configured to carry out the first and second operating steps and the polytropic compression step on the supply carrier fluid.

In this embodiment, moreover, the engine body 40 is integral with the recirculation circuit 70 and with the stilling and mixing tank 20.

In other words, the capacitive tank 20 and the recirculation circuit 70 are formed inside the engine body 40 and defined by the operation and movement of the components thereof.

In detail, the engine body 40 has a supply chamber 51 and a discharge chamber 52, which are formed in the cylinder and placed between the work chamber 41 and the inlet port 42 and between the work chamber 41 and the outlet port 43, respectively.

The supply valve 46 and the discharge valve 47 are associated with the supply chamber 51 and the discharge chamber 52, respectively.

In particular, each of the valves 46, 47 is a poppet valve and comprises a lower planar element 46*a*, 47*a* configured to close a bottom portion of the respective chamber 51, 52 so as to define a hermetic separation from the work chamber 41, and a stem 46*b*, 47*b*, integral with the lower planar element 46*a*, 47*a*.

Each of the valves 46, 47 is slidingly constrained in the respective chamber 51, 52 so as to define a translation movement with a linear trajectory.

The inlet port 42 is formed in the engine body 40 in an upper portion thereof and is substantially transverse to a longitudinal axis of the supply chamber 51.

Likewise, the outlet port 43 is formed in the engine body 40 in an upper portion thereof and is substantially transverse to a longitudinal axis of the discharge chamber 52.

The supply valve 46, according to a particular structural aspect, has a cavity 46*c* formed inside the stem 46*b*, which defines a first containment volume "V1". The stem 46*b* also has a through hole 46*d* for said cavity 46*c*, preferably formed transversely in the stem 46*b*.

The valve also has a closing element 46*e* for closing the cavity 46*c*.

Preferably, this closing element 46*e* is threaded and, depending on how tight it is in the cavity 46*c*, allows the size of the first containment volume "V1" to be adjusted.

The supply chamber 51, together with the supply valve 46, defines a second containment volume "V2". In other words, this second containment volume "V2" is defined as the volume of the supply chamber 51 from which the bulk of the supply valve 46 and the first containment volume "V1" are subtracted.

In this embodiment, the thus defined first containment volume "V1" and second containment volume "V2" define the capacitive tank 20.

According to a further aspect of the present invention, the dimensional ratio between the first containment volume "V1" and the second containment volume "V2" is 1 to 23.

The supply valve 46 is movable inside the supply chamber 51 so that it can assume four respective operating configurations.

In particular, the supply valve 46 can assume a closed configuration, also defined as the first configuration, shown in FIG. 2*c*, in which the through hole 46*d* faces the inlet port 42 of the engine body 40 and in which the lower planar element 46*a* closes the supply chamber 51 at the bottom. Moreover, in this closed configuration, the stem 46*b*, substantially adhering to the walls of the engine body 40, closes the supply chamber 51 at the top.

When the supply valve 46 is lowered, it can assume a second configuration, in which the through hole 46*d* does not face the inlet port 42, which is closed by the stem 46*b*, and in which the lower planar element 46*a* closes the supply chamber 51 at the bottom. In this configuration, the stem 46*b* still closes the supply chamber 51 at the top so that the first containment volume "V1" is not in fluid communication with the second containment volume "V2".

When the supply valve 46 is lowered still further, it can assume a third configuration, in which the through hole 46*d* does not face the inlet port 42, which is closed by the stem 46*b*, and in which the lower planar element 46*a* closes the supply chamber 51 at the bottom. In this configuration, the first containment volume "V1" is in fluid communication with the second containment volume "V2".

Lastly, the supply valve 46 can assume an open configuration, also defined as the fourth configuration, in which the stem 46*b* closes the inlet port 42 and the first "V1" and second "V2" containment volumes are in fluid communication with the work chamber 41.

The discharge valve 47, on the other hand, can assume two operating configurations.

In particular, the discharge valve 47 can assume a closed configuration, in which the discharge valve 47 closes the supply chamber 52 and the outlet port 43 at the bottom, and an open configuration, in which the outlet port 43 is in fluid communication with the work chamber 41.

Advantageously, as shown in the attached figures, according to a further structural aspect, since in the open configuration the supply valve 46 or the discharge valve 47 could at least partially enter the work chamber 41, a number of recesses are formed on the movable wall 44, the recesses being at least partially shaped complementarily to the supply and discharge valves 46, 47 so as not to abut against them.

A movement cycle of the above embodiment of the engine body 40 will be described in detail hereinafter.

In the following description, a movement cycle of the engine body 40 is described as a function of the angle assumed by the drive shaft 50 during its rotation, which occurs in a clockwise direction.

In particular, the position of the drive shaft 50 in which the movable wall 44 is in the upper dead centre is assumed as an angle of 0 degrees.

Figure 3B:
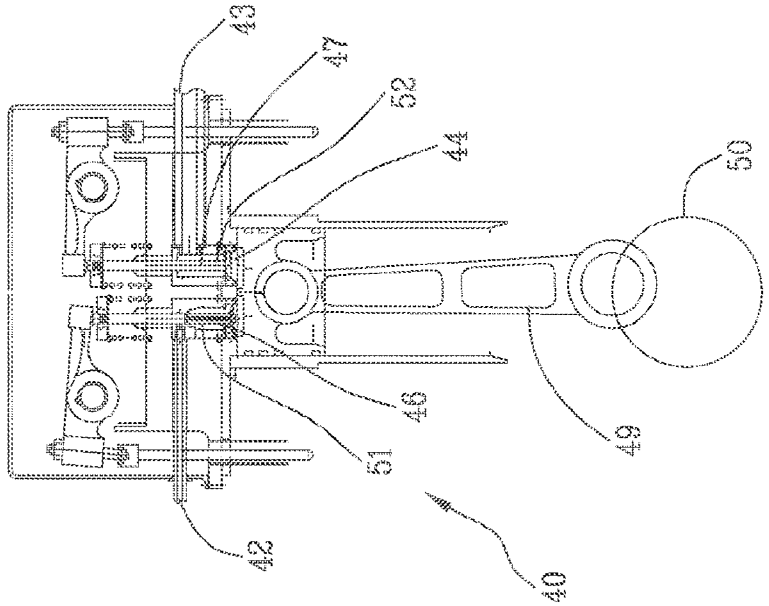
FIGS. 3A-3F show respective views of the component in FIGS. 2A-2C in different operating configurations.
Figure 3A:
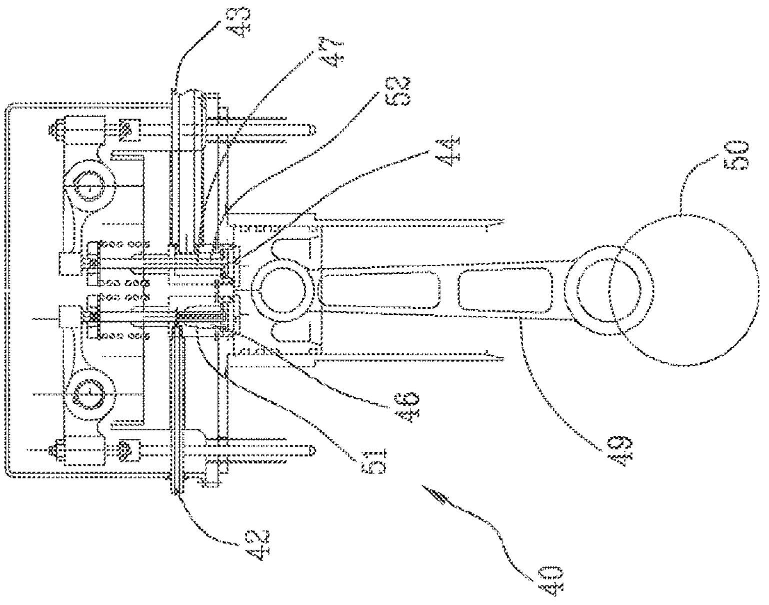

In particular, FIG. 3A shows an initial step in which the supply valve 46 is in the closed configuration, or first configuration, and the discharge valve 47 is in the closed configuration.

In this step, the recirculating carrier fluid is within the second containment volume "V2".

The first containment volume "V1" is filled with the "ex-liquid" carrier fluid from the supply circuit 30 through the inlet port 42.

Preferably, according to a preferred use of the plant 1, the mass ratio between the "ex-liquid" carrier fluid and the recirculating carrier fluid is 1 to 23. Advantageously, this allows very low consumption.

The movable wall 44 is close to the upper dead centre.

During this step, the drive shaft 50 is moved from the angle of 356 degrees to the angle of 6 degrees.

FIG. 3B shows a subsequent step of the movement cycle in which the discharge valve 47 is in the closed configuration. During this step, the supply valve 46 is first switched to the second configuration so as to close the inlet port 42, and then switched to the third configuration so that the first containment volume "V1" is in fluid communication with the second containment volume "V2". In this configuration, the recirculating carrier fluid can mix with the "ex-liquid" carrier fluid from the supply circuit 30, thereby obtaining the supply carrier fluid.

This step corresponds to the first operating step of the engine body 40 described above.

During this step, the movable wall 44 is still substantially close to the upper dead centre and the drive shaft 50 is moved from the angle of 6 degrees to the angle of 12 degrees.

Figure 3D:
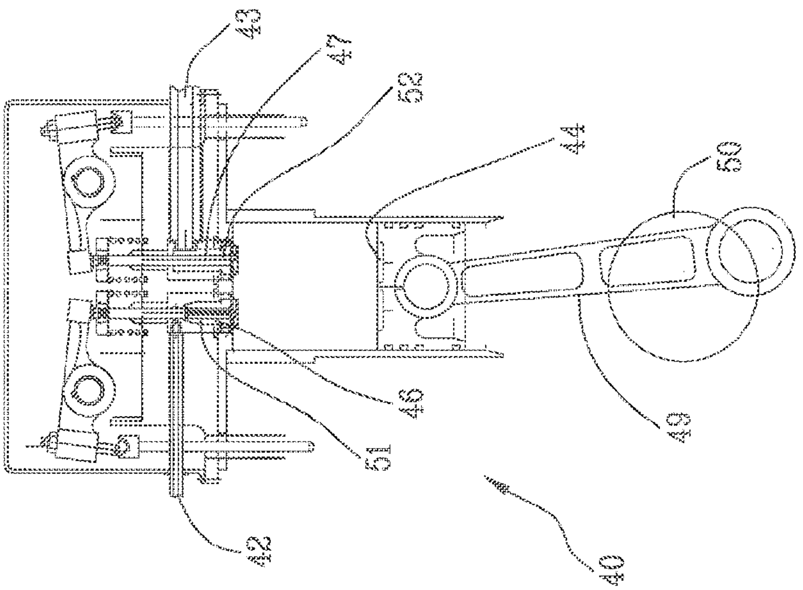
Figure 3C:
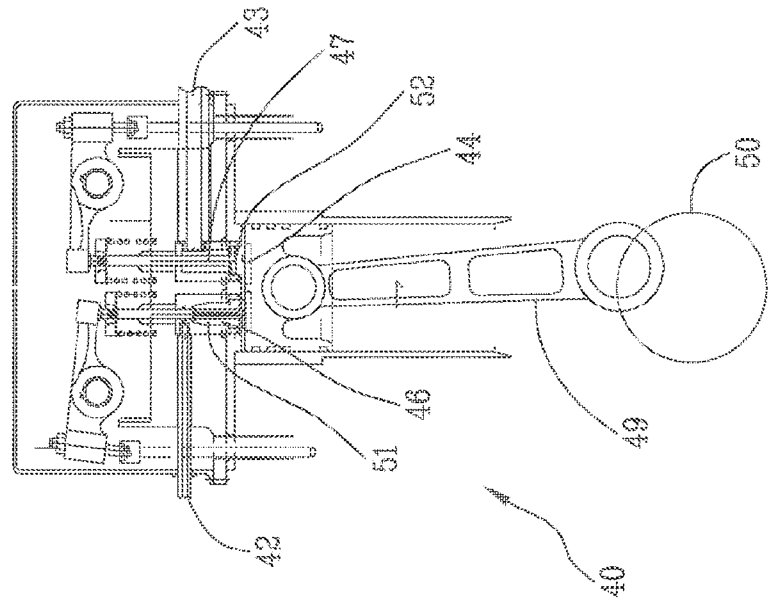

FIG. 3C shows a step in which the supply valve 46 is switched to the open configuration, or fourth configuration, whereas the discharge valve 47 is in the closed configuration.

During this step, the first containment volume "V1" and the second containment volume "V2" are in fluid communication with the work chamber 41 so that the supply carrier fluid can move into the work chamber 41. This step corresponds to the second operating step of the engine body 40 described above. The movable wall 44 is moved downwards by the thrust of the carrier fluid in the supply conditions. During this step, the drive shaft 50 is moved from the angle of 12 degrees to the angle of 170 degrees.

FIG. 3D shows a step of the movement cycle in which both the supply valve and the discharge valve 46, 47 are in the open configuration.

During this step, a quantity of spent carrier fluid, corresponding to the quantity of carrier fluid coming from the supply circuit 30, is conveyed into the discharge circuit 60 from the work chamber 41. The movable wall 44 is close to the lower dead centre.

During this step, the drive shaft 50 is moved from the angle of 170 degrees to the angle of 180 degrees.

Figure 3F:
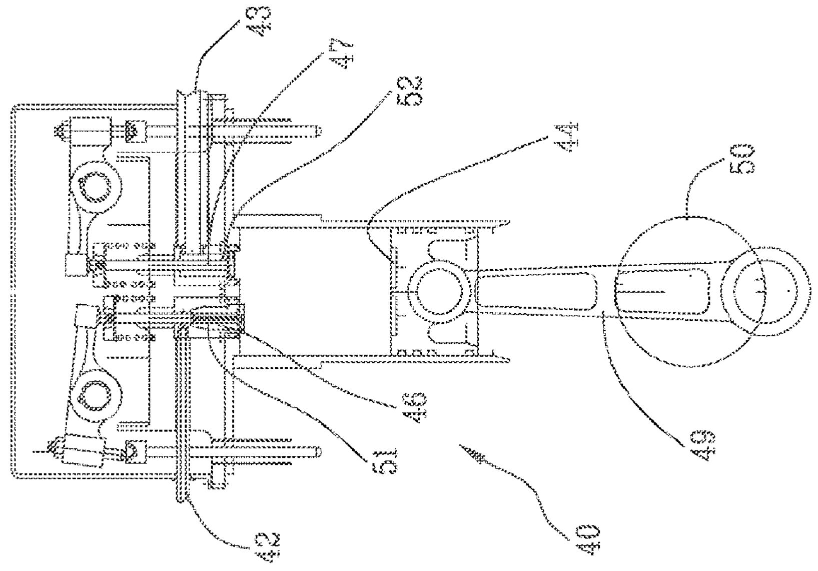
Figure 3E:
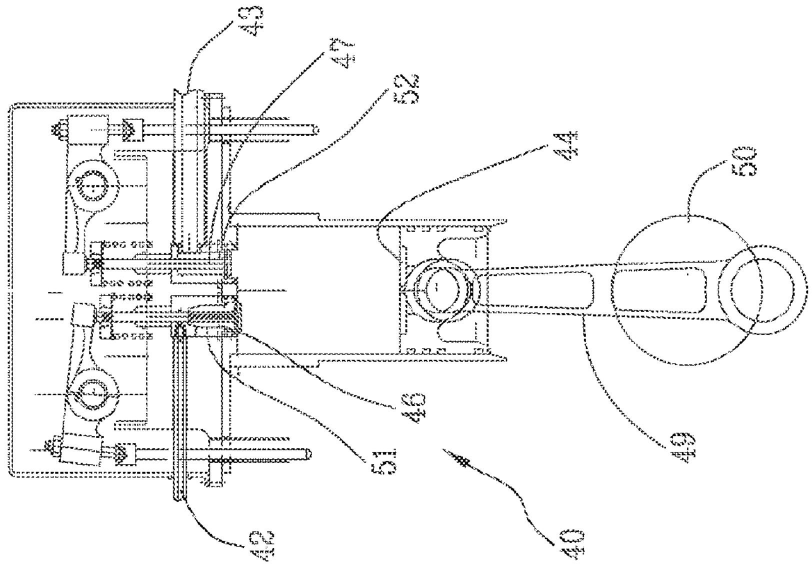

FIG. 3E shows a step of the movement cycle in which the supply valve 46 is in the open configuration, or first configuration, whereas the discharge valve 47 is switched to the closed configuration. During this step, the spent carrier fluid undergoes the adiabatic compression by the movable wall 44.

During this step, the drive shaft 50 is moved to the angle of 180 degrees.

During this step, moreover, the work chamber 41 contains a quantity of carrier fluid corresponding to the recirculating carrier fluid.

Lastly, FIG. 3F shows a step of the movement cycle in which, following the polytropic compression, the recirculating carrier fluid is in the capacitive tank 20.

During this step, the drive shaft 50 is moved from the angle of 180 degrees to the angle of 356 degrees.

Advantageously, this embodiment has several advantages which make its use extremely efficient.

The first relates to the structural simplicity of the engine body 40. In fact, the engine body 40 is substantially structured as a generic Diesel engine. Advantageously, in other words, any existing Diesel or Otto engine can be converted into said engine body 40.

In particular, the engine body 40 of the invention can be obtained by modifying an existing Diesel or Otto engine. In this case, the modifications are limited to the cylinder head and to the control of the valves, which can be done mechanically or electronically.

The second advantage is linked to the compactness of the plant 1. In fact, the recirculation circuit 70 and the capacitive tank 20 are formed inside the engine body 40.

A further embodiment of the plant 1, not shown in the accompanying figures, will now be described.

In this embodiment, the recirculation circuit 70 is associated with the collection tank 61 of the discharge circuit 60 and comprises a compressor connected and moved by the engine body 60.

Essentially, the compressor is configured to perform three distinct functions, in particular:

- extracting from the collection tank 61 a portion of spent carrier fluid in the quantity calculated for recirculation, in volumetric terms, and according to the desired plant discharge temperature, by means of pilot-operated valves for flow interception and regulation;
- compressing the carrier fluid;
- conveying the compressed, spent carrier fluid into the capacitive tank 20, where the pressure and temperature can be measured by suitable measuring instruments.

Moreover, a check valve can be arranged between the compressor and the capacitive tank 20, so that the carrier fluid contained in the capacitive tank 20 does not return to the compressor.

According to one aspect of the present invention, the operation of the plant can be entrusted to the rotation of the drive shaft 50 or to a control unit.

The present invention also relates to a method for producing mechanical energy from a carrier fluid under cryogenic conditions, which can be preferably carried out by means of the aforesaid plant 1.

The method comprises preliminary steps of preparing the cryogenic tank 10 containing a carrier fluid at a cryogenic temperature Tcryo and a pressure level Pcryo. This state of the carrier fluid is indicated in the Mollier diagram in FIG. 4 by the reference "A".

The method also comprises the preliminary steps of preparing the capacitive tank 20 and the engine body 40 designed to host an expansion phase and a compression phase.

The method further comprises the preliminary step of supplying the capacitive tank 20 with a mass M2 of carrier fluid at a recirculation temperature Trec and at the pressure level Prec. This mass M2 of carrier fluid in the aforementioned recirculation conditions is indicated in the Mollier diagram in FIG. 4 by the reference "D".

At this point, the method comprises cyclical steps.

In particular, the method comprises a step wherein the pressure of the carrier fluid is raised from the Pcryo level to the Pproc level, where Pproc is greater than Pcryo and greater than Prec. This condition is indicated in the Mollier diagram in FIG. 4 by the reference "B".

Preferably, the step of raising the pressure of the carrier fluid from the Pcryo level to the Pproc level is carried out by means of the pump 31.

Next, the method comprises a step wherein the temperature of the carrier fluid is raised from Tcryo to a first process temperature Tproc1, where Tproc1 is greater than Tcryo, and a step wherein the temperature of the carrier fluid is raised from Tproc1 to a second process temperature Tproc2, where Tproc2 is greater than Tproc1.

This condition is indicated in the Mollier diagram in FIG. 4 by the reference "C".

These steps are preferably carried out by the main heat exchanger 32.

Moreover, in these steps, the carrier fluid is transformed from liquid to gas, thereby obtaining the carrier fluid in the aforementioned "ex-liquid" conditions.

The method then comprises a step wherein the capacitive tank 20 is supplied with a mass M1 of working fluid at the temperature Tproc2 and pressure level Pproc.

Preferably, the mass M2 of the carrier fluid comes from the recirculation circuit 70, whereas the mass M1 of the carrier fluid comes from the supply circuit 30.

At this point, the method comprises a step wherein the masses M1 and M2, "ex-liquid" and recirculating, respectively, of the carrier fluid are mixed, thereby obtaining a mass M1+M2 of the carrier fluid at the supply temperature Tfeed and pressure level Pfeed.

It is recalled that the pressure Prec of the recirculating carrier fluid is lower than the pressure Pfeed of the supply carrier fluid. Furthermore, the temperature Trec of the recirculating carrier fluid is higher than the temperature Tfeed of the supply carrier fluid.

This mass M1+M2 is in the aforesaid supply carrier fluid conditions. This condition is indicated in the Mollier diagram in FIG. 4 by the reference "E".

Once the mass M1+M2 of the carrier fluid has been obtained, it is supplied from the capacitive tank 20 to the engine body 40 at the pressure level Pfeed and supply temperature Tfeed.

The method then comprises a step of expanding the mass M1+M2 of carrier fluid in the engine body 40, so as to lower the pressure from the level Pfeed to the level Pex, wherein Pex is less than Pproc, and to lower the temperature from Tfeed to Tex, wherein Tex is less than Tfeed, thereby producing mechanical energy.

This step is indicated in the Mollier diagram in FIG. 4 by the reference "EG".

The condition of end of expansion of the carrier fluid is indicated in the Mollier diagram in FIG. 4 by the reference "G".

Lastly, the method comprises a step of discharging the mass M1 of fluid towards an external environment.

This step is preferably carried out with the discharge circuit 60. The discharge conditions are indicated in the Mollier diagram in FIG. 4 by the reference "F".

The method further comprises a step of compressing the mass M2 of fluid so as to raise the pressure from the level Pex to the level Prec and so as to raise the temperature from Tex to Trec and supply the capacitive tank 20 with the mass M2 at the pressure level Prec and supply temperature Trec. This step is indicated in the Mollier diagram in FIG. 4 by the reference "GD".

Preferably, the step of compressing the mass M2 of fluid so as to raise the pressure from the level Pex to the level Prec and to raise the temperature from Tex to Trec and supply the capacitive tank 20 with the mass M2 at the pressure level Prec and supply temperature Trec is carried out by means of the recirculation circuit 70.

According to one embodiment of the method, the carrier fluid spent is nitrogen. In this embodiment, the pressure and temperature values are the following:

the pressure level Patm is approximately equal to atmospheric pressure; and the pressure level Pproc has a value ranging between approximately 300 bar and approximately 400 bar;

the pressure level Pfeed has a value ranging between approximately 250 bar and approximately 300 bar;

the pressure level Pex has a value ranging between approximately 2 bar and approximately 4 bar;

the temperature Tcryo is approximately −205° C.;

the temperature Tproc1 is approximately −80° C.;

the temperature Tproc2 is approximately +70° C.;

the temperature Trec is approximately +680° C.;

the temperature Tfeed is approximately +480° C.; and the temperature Tex ranges between approximately −20° C. and approximately +20° C.

According to a further embodiment of the method, the carrier fluid is methane. In this embodiment, the pressure and temperature values are the following:

the pressure level Patm is approximately equal to atmospheric pressure; and the pressure level Pproc has a value ranging between approximately 200 bar and approximately 220 bar;

the pressure level Pfeed has a value ranging between approximately 150 bar and approximately 200 bar;

the pressure level Pex has a value ranging between approximately 2 bar and approximately 4 bar;

the temperature Tcryo ranges between approximately −130° C. and approximately −90° C.;

the temperature Tproc1 ranges between approximately −40° C. and approximately −30° C.;

the temperature Trec is approximately +360° C.;

the temperature Tfeed ranges between approximately +280° C. and approximately +300° C.; and the temperature Tex ranges between approximately −20° C. and approximately +20° C.

Advantageously, the present invention overcomes the drawbacks encountered in the prior art.

In particular, an achieved object is that of providing a plant and a method for producing mechanical energy from a carrier fluid under cryogenic conditions, which are free of condensation and/or "ice" problems at the discharge of the plant itself.

This result is achieved by the presence of the recirculation circuit 70, which allows a temperature of the spent carrier fluid at the outlet of the plant 1 sufficient to prevent the formation of condensation and/or ice.

A further achieved object is that of providing a plant and a method for producing mechanical energy from a carrier fluid under cryogenic conditions, which are capable of operating with very low consumption of carrier fluid.

This result is achieved by means of the recirculation circuit 70, which allows very low consumption of carrier fluid.

A further achieved object is that of providing a plant and a method for producing mechanical energy from a carrier fluid under cryogenic conditions, which do not affect the environment.

This result is achieved through the possibility of operating in the absence of combustion.

The invention claimed is:

1. A plant for producing a mechanical energy from a carrier fluid under cryogenic conditions, comprising:

a cryogenic tank configured for storing said carrier fluid under said cryogenic conditions;

a capacitive tank;

a supply circuit, connecting said cryogenic tank to said capacitive tank and comprising a pump, configured to increase a pressure of said carrier fluid, and a main heat exchanger, arranged downstream of said pump and configured to promote a thermal exchange between a thermal source and said carrier fluid to increase a temperature of said carrier fluid and evaporate said carrier fluid;

an engine body, configured for producing said mechanical energy and comprising at least one work chamber having an inlet port, arranged in fluid communication with said capacitive tank, and an outlet port connected to a discharge circuit for spent carrier fluid spent from the at least one work chamber;

a recirculation circuit configured to convey a portion of said carrier fluid spent from the at least one work chamber into said capacitive tank;

wherein the plant is in an open cycle configuration.

2. The plant according to claim 1, wherein said engine body is configured to:

receive the carrier fluid;

host an expansion phase of the carrier fluid;

convert a displacement and/or expansion of the carrier fluid into the mechanical energy; and host a compression phase of the spent carrier fluid.

3. The plant according to claim 1, wherein said recirculation circuit and/or said capacitive tank are integral with said engine body.

4. The plant according to claim 1, wherein said engine body has a reciprocating motion configuration.

5. The plant according to claim 1, and further comprising a replenishment circuit, joined to said discharge circuit and/or said supply circuit and configured to convey a portion of carrier fluid in a gaseous state into said cryogenic tank.

6. The plant according to claim 1, and further comprising an auxiliary plant for producing mechanical energy.

7. The plant according to claim 6, wherein said auxiliary plant comprises an engine, joined to or able to be joined to said main heat exchanger and operationally placed between said thermal source and said main heat exchanger to transfer heat to said carrier fluid by said main heat exchanger.

8. The plant according to claim 7, wherein said engine is a Stirling engine.

9. The plant according to claim 1, wherein said engine body comprises a supply valve joined to said inlet port and slidably inserted into a supply chamber, said supply chamber facing, above, said at least one work chamber; said supply valve comprising a lower planar element, configured to insulate said supply chamber from said at least one work chamber in a closed configuration of said supply valve, and a stem having a through hole configured to face said inlet port in said closed configuration of said supply valve so as to make said inlet port communicate with a cavity formed in said stem.

10. A method for producing mechanical energy from a carrier fluid under cryogenic conditions, comprising the preliminary steps of:

preparing a cryogenic tank containing the carrier fluid at a cryogenic temperature Tcryo and a pressure level Pcryo;

preparing a capacitive tank;

preparing an engine body designed to house an expansion phase and a compression phase;

supplying said capacitive tank with a mass M2 of the carrier fluid at a pressure level Prec and a supply temperature Trec;

said method also comprising the cyclical steps of:

raising a pressure of the carrier fluid from the Pcryo level to a Pproc level, where the Pproc level is greater than the Pcryo level and the Prec level;

raising a temperature of the carrier fluid from the temperature Tcryo to a first process temperature Tproc1, where the temperature Tproc1 is greater than the temperature Tcryo;

raising the temperature of the carrier fluid from the temperature Tproc1 to a second process temperature Tproc2, where the temperature Tproc2 is greater than the temperature Tproc1;

supplying the capacitive tank with a mass M1 of a working fluid at the temperature Tproc2 and the pressure level Pproc;

mixing the mass M1 of the working fluid and the Mass M2 of the carrier fluid, obtaining a mass M1+M2 of the carrier fluid at a supply temperature Tfeed and a pressure level Pfeed;

supplying said mass M1+M2 of the carrier fluid at the pressure level Pfeed and the supply temperature Tfeed from the capacitive tank to the engine body;

expanding the mass M1+M2 of the carrier fluid in the engine body, to lower the pressure level of the mass M1+M2 from the pressure level Pfeed to a pressure level Pex, wherein the pressure level Pex is less than the pressure level Pfeed, and to lower the temperature of the mass M1+M2 from the temperature Tfeed to a temperature Tex, wherein the temperature Tex is less than the temperature Tfeed, producing mechanical energy;

discharging the mass M1 of the working fluid towards an external environment;

compressing the mass M2 of the carrier fluid to raise the pressure level of the mass M2 of the carrier fluid from the pressure level Pex to the pressure level Prec to raise the temperature of the mass M2 of the carrier fluid from the temperature Tex to a temperature Trec to supply said capacitive tank with said mass M2 of the carrier fluid at the pressure level Prec and the supply temperature Trec.

11. The method according to claim 10, wherein the carrier fluid is nitrogen.

12. The method according to claim 11, wherein:

a pressure level Patm is approximately equal to atmospheric pressure; and the pressure level Pproc has a value ranging between approximately 300 bar and approximately 400 bar;

the pressure level Pfeed has a value ranging between approximately 250 bar and approximately 300 bar;

the pressure level Pex has a value ranging between approximately 2 bar and approximately 4 bar;

and wherein:

the temperature Tcryo is approximately −205° C.;

the temperature Tproc1 is approximately −80° C.;

the temperature Tproc2 is approximately +70° C.;

the temperature Trec is approximately +680° C.;

the temperature Tfeed is approximately +480° C.; and the temperature Tex ranges between approximately −20° C. and approximately +20° C.

13. The method according to claim 10, wherein the carrier fluid is methane.

14. The method according to claim 13, wherein:

a pressure level Patm is approximately equal to atmospheric pressure; and the pressure level Pproc has a value ranging between approximately 200 bar and approximately 220 bar;

the pressure level Pfeed has a value ranging between approximately 150 bar and approximately 200 bar;

the pressure level Pex has a value ranging between approximately 2 bar and approximately 4 bar;

and wherein:

the temperature Tcryo ranges between approximately −130° C. and approximately −90° C.;

the temperature Tproc1 ranges between approximately −40° C. and approximately −30° C.;

the temperature Trec is approximately +360° C.;

the temperature Tfeed ranges between approximately +280° C. and approximately +300° C.; and the temperature Tex ranges between approximately −20° C. and approximately +20° C.

* * * * *